Aug. 19, 1947.   E. V. MURPHREE ET AL   2,425,754
HYDROGEN PRODUCTION
Filed Jan. 8, 1941
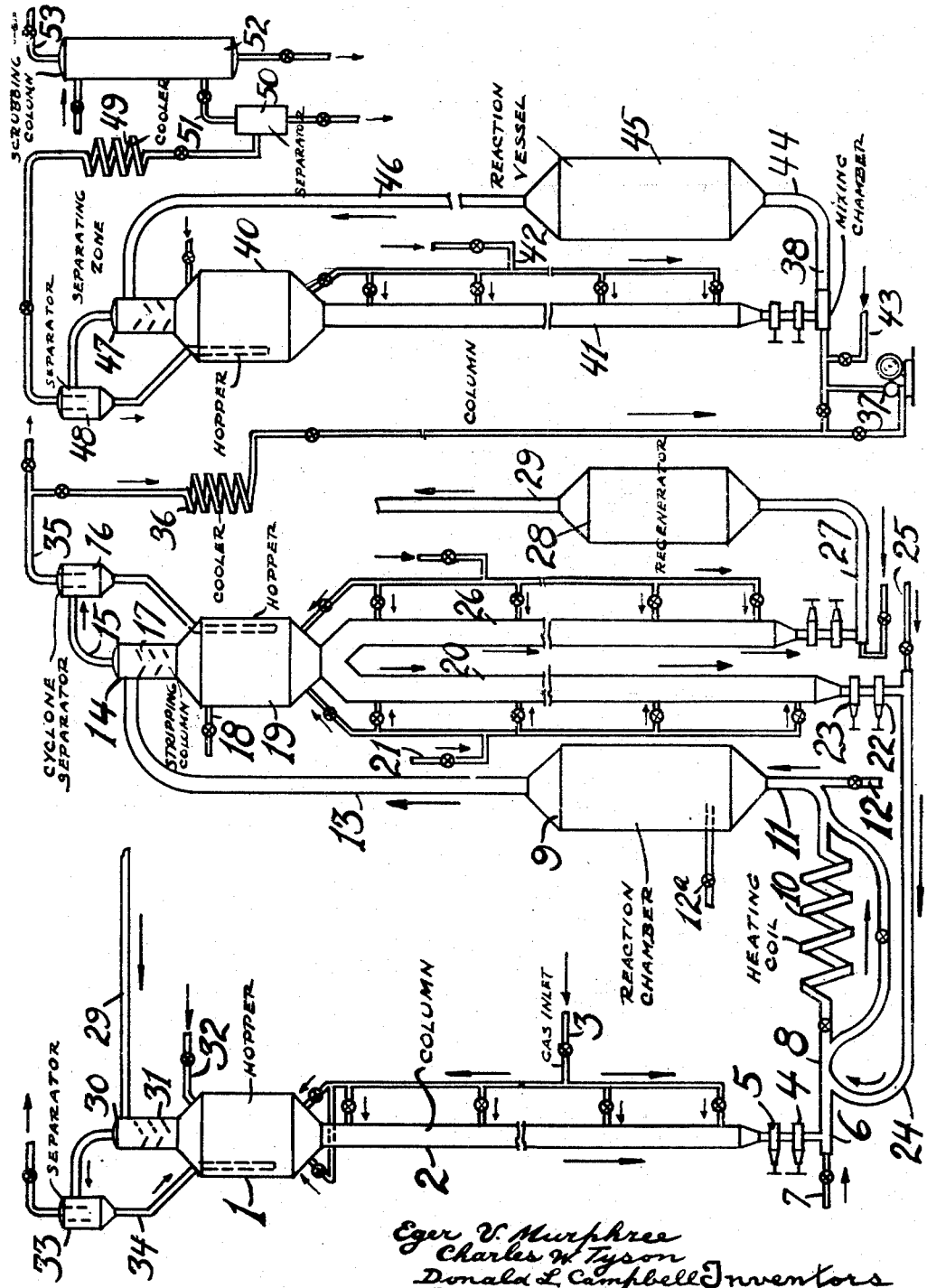
Eger V. Murphree
Charles W. Tyson
Donald L. Campbell  Inventors
Homer Z. Martin
By P. F. Young  Attorney Patented Aug. 19, 1947

2,425,754

UNITED STATES PATENT OFFICE 2,425,754

HYDROGEN PRODUCTION

Eger V. Murphree and Charles W. Tyson, Summit, Donald L. Campbell, Short Hills, and Homer Z. Martin, Elizabeth, N. J., assignors, by mesne assignments, to Standard Catalytic Company, a corporation of Delaware Application January 8, 1941, Serial No. 373,536

1 Claim. (Cl. 23—210)

This invention relates to an improved process and apparatus for the production of hydrogen, and more particularly, to processes involving the reaction of hydrocarbon gases or vapors with oxidizing reagents, such as steam, carbon dioxide, oxygen, air and the like with the production of hydrogen and oxides of carbon.

The preparation of hydrogen by such reactions, particularly the reaction of methane with steam, is already known and numerous catalysts have been described which are active in promoting the desired reactions. These processes, in general, have been conducted heretofore by passing a mixture of the hydrocarbon gas or vapor and steam or other oxidizing agent in proper proportions and concentrations through a reaction chamber filled with a suitable catalyst in lump, tablet or other solid form or containing such solid catalysts arranged in beds or trays in the reaction zone. The reaction conditions of temperature, pressure, time of contact and the like, as well as the nature of the catalyst, are selected with regard to the type of operation and product desired, atmospheric and relatively low superatmospheric pressures usually being used in the reaction of methane with steam to produce hydrogen with catalysts such as active nickel or other metals of the iron group usually mixed with supporting materials, such as bauxite, Alundum, alumina, silica, clays, pumice and the like.

An improved process has now been devised for conducting such reactions with solid catalyst particles which are suspended in a gaseous stream, the suspension being passed into the reaction zone. The catalyst is thus maintained in an actively mobile or fluidized state in the reaction zone, permitting much more effective contact with the gaseous reagents, uniform temperatures throughout the reaction zone, improved heat transfer and improved yields of products of better quality. As an alternative, these processes may also be conducted by passing a gaseous mixture of a hydrocarbon and a suitable oxidizing gas, such as steam, in proper proportions and concentrations with suspended solid catalyst particles through a reaction zone. The addition of this catalyst to the stream of gaseous reagents, its separation after the reaction is complete, and its return to the reagent stream has, in accordance with previous known practices, required the use of mechanical moving parts, such as screw pumps, star feeders, and extensive systems of catalyst hoppers, at one or more points in the catalyst circulation system. These moving mechanical parts were required to introduce the catalyst from a storage or supply zone of relatively lower pressure into a reaction or treating zone of relatively higher pressure.

The present invention provides a very simple and effective method for introducing the catalyst into zones of higher pressure or higher elevation, even in continuous operation, without the use of any moving mechanical parts, thereby permitting great simplification and economies in both the apparatus and the process. Other solid materials, which serve as reagents supplying oxygen for reaction with the hydrocarbons, or to remove carbon dioxide as a solid carbonate, or which may serve simply as diluents for the catalyst and as means for transferring heat, may also be used along with the catalyst in this invention.

The invention in its more specific phases is especially directed to processes in which the solid catalyst after passing through the reaction zone is separated from the gaseous stream and again returned to the reaction zone. In particular, it has application to processes in which it is desirable (1) to reactivate or regenerate at least a portion of the catalyst before returning it to the reaction zone, or (2) to rapidly add or extract heat from the reaction zone in which strong exothermic or endothermic reactions are carried out.

Other and further objects and advantages of this invention will be apparent from the following description, the claim and the drawings:

The drawing is a diagrammatic illustration in partial sectional elevation of an apparatus suitable for carrying out various modifications of the process of this invention, and indicates the flow of materials.

A suitable solid catalyst in finely divided or powdered form is supplied to the catalyst feed hopper 1. The catalyst passes down a long and preferably vertical column 2 which is of sufficient height to provide the desired pressure at the base of this column, as will be explained below. Any suitable means is also provided for maintaining the catalyst particles in the hopper 1 and the column 2 in a readily mobile state. It has been found, for example, that finely powdered catalyst packs together and can be caused to flow only with difficulty if the surfaces of the solid particles are free from gas; this packing occurs even when the catalyst powder stands in a hopper in contact with air or other gas. The same catalyst powder flows readily in a manner closely simulating that of a liquid if even a thin layer of gas is maintained around each particle.

This may be accomplished by passing a small stream of a suitable gas, such as an inert gas or one of the reagents to be used in the process, into the column 2 at one or more points, preferably at least at a point near the top of this column, by gas supply line 3, which may also be used to supply gas to several points around the base of the hopper 1 in order to insure that the catalyst is in a continuously fluid condition. The flow of catalyst in the column may also be aided by shaking the column or the contents thereof, as by striking the outside of the column with heavy blows sufficient to cause some vibration thereof, by providing a vibrating or rotating rod or other suitable means for stirring or shaking the catalyst inside the column 3, or by admitting the gas through line 3 in pulses so as to induce vibration directly in the catalyst column.

Such means for mechanically inducing vibration are useful primarily with solid catalysts of relatively large particle size; with fine catalyst powders, sufficient gas should be provided to maintain a film of gas around each catalyst particle at the zone of highest pressure. When this is done, satisfactory flow of such catalyst powders is generally secured without any provision for shaking the catalyst.

The apparatus illustrated in the drawing is designed for the use of such finely powdered catalysts, although it will be understood that catalysts of much coarser particle sizes may also be used.

It has been found possible by using a column of the type described containing mobile or fluidized, finely divided solid catalyst, to provide a pressure head at the bottom of the column which is similar to the hydraulic or hydrostatic pressure head of a fluid column, the pressure being a direct function of the density of the catalyst powder and of the column height. For example, using a catalyst consisting of solid particles of about 200 to 400 mesh size of activated clay having deposited thereon metals of the iron group, the pressure obtainable with the column described is about $\frac{1}{5}$ to $\frac{1}{8}$ pound per sq. in. per foot of column height. Thus a column 100 feet in height may be used to supply such catalysts in a continuous stream at a gage pressure of about 12.5 to 20 pounds per square inch, with the top of the column at atmospheric pressure.

This device has been especially effective as a means for supplying the catalyst, intermittently or continuously, to a reaction zone without the necessity of using for this purpose any apparatus having moving parts which come in contact with the catalyst. The star feeders, blow cases, plunger and screw operated pumps of the Fuller Kinyon type heretofore used for this purpose are accordingly eliminated.

The lower end of the column 2 is provided with a suitable valve 4 for regulating the amount of catalyst discharging therefrom. A conventional slide valve having an apertured slide which can be adjusted to regulate the size of the orifice through which the powder passes is suitable for this purpose, although other types of valves may be used. This valve may be operated manually or automatically, such as by the level in the hopper 1 or by a venturi or other type of meter in the stream of gaseous reagents or in the suspension of catalyst flowing to or from the reaction zone, to be described below. A drop in pressure across the valve 4 of about 2 to 5 pounds per square inch is generally desired in order to provide adequate control of the flow of the catalyst powder.

Valve 4 may also be so controlled as to avoid breaking the seal of powdered material in column 2 due to sudden pressure surges or other causes. For this purpose, it may be caused to close quickly in case the level of powdered material in hopper 1 falls below a certain predetermined level or in case pressure drop across valve 4 falls below a certain level. Pressure surges or other indications of abnormal conditions may also be used to cause valve 4 to close.

As a safety precaution to prevent the possibility of the carrying gases, to be described below, from passing upwardly through the standpipe, a second safety valve 5 is preferably provided. This valve may be operated automatically to close when the level of powder in the hopper 1 drops below a predetermined point, or it may be designed to close automatically when the pressure below the valve 4 approaches or equals the pressure above the valve 4.

The catalyst powder thus leaves the bottom of column 2 through the valve 4 and passes into a mixing chamber 6, to which a suitable gas, either an inert gas or preferably one or more of the reagents to be used in the process, is supplied by line 7. This gas is supplied in sufficient quantity and velocity to substantially completely entrain the catalyst, and this suspension is then passed as a freely flowing stream through any suitable pipe 8 or other conduit to the reaction vessel 9. The catalyst suspension leaving the mixing chamber 6 may also be subjected to any suitable preliminary treatment, such as heat, and/or mixing with other reagents, prior to its introduction into the reaction chamber 9; for example, the catalyst suspension may be passed from the mixing zone 6 through line 8 and heating coil 10 and line 11 into the reaction chamber 9. Additional reagents may be supplied by line 12.

While the catalyst may be passed either upwardly or downwardly through the reaction zone 9, it is generally preferred to introduce the catalyst suspension into the lower portion of the reaction vessel and to pass it upwardly therethrough. In this manner of operation, the more dense catalyst particles will lag behind the less dense suspending gases, and the catalyst concentration in the reaction zone will thus be substantially greater than in the suspension of catalyst supplied thereto. It is also generally preferred to pass the gases and/or vapors (the term gas being used throughout this application to indicate a gasiform state including both normally gaseous materials and the vapors of liquids) upwardly through the reaction zone at such a rate that the solid catalyst particles are partially suspended therein in a highly mobile, vibrating condition such that the mass of catalyst particles has the highly turbulent appearance of a boiling liquid. This involves the use in the reaction zone of an average upward velocity of the gas which is insufficient to blow all of the catalyst quickly out of the reaction zone, but which is sufficient to carry overhead a catalyst suspension containing about the same quantity of catalyst per unit of time as in the suspension supplied to the bottom of the reaction vessel.

The temperature of the reaction zone may be controlled by the amount and temperature of the materials supplied thereto and/or by heat exchange through the walls. The processes of this invention involving the production of hydrogen by reaction of hydrocarbons with steam or carbon dioxide are highly endothermic and it is necessary to supply very large amounts of heat in order to maintain the reaction zone at a suitable temperature level. This heat requirement may be supplied by preheating the initial reagents, especially the steam or carbon dioxide, and/or the catalyst to temperatures substantially higher than the desired reaction temperature; the supply of heat in this manner may be greatly augmented by recycling relatively large proportions of heated catalyst. The reactor may also be designed as a long, slender vessel or tube, or even a plurality of such tubes connected in parallel with provisions for supplying heat through the walls thereof.

In such a process, for example, the catalyst may be passed with steam through a heating coil 10 and may then be mixed with a stream of hydrocarbon gas or vapor supplied by line 12 which has been separately preheated to a temperature insufficient to cause substantial cracking of the hydrocarbons.

The heat required for such reactions may also be supplied wholly or in part by the addition to the reaction zone of oxygen or of gases containing free oxygen. In this manner, the heat required for the reaction may largely be supplied by reaction of the free oxygen with the carbonaceous materials or products of the reaction; a selective oxidation to oxides of carbon may also be obtained so that the desired heat is provided without substantial loss of hydrogen. Where hydrogen or a mixture of hydrogen and oxides of carbon of high purity is desired, such free oxygen should also be of substantial purity. If nitrogen is not objectionable in the reaction products, air or air enriched to any desired degree with oxygen may be used. Such a process is particularly advantageous for the production of mixtures of hydrogen and nitrogen for use in the synthesis of ammonia. Such gases containing free oxygen may also be supplied by line 12, but are preferably introduced separately into a zone of extreme turbulence in the reaction vessel, as by line 12a. Solid materials capable of supplying oxygen under the reaction conditions may also be circulated with the catalyst to aid in reducing the heat requirements of the reaction. Examples of suitable materials of this kind are the readily reducible metal oxides, such as cupric oxide, nickel oxide, ferric oxide and the like. Such materials may be recycled and reoxidized to their original state during the regeneration of the catalyst, to be described below.

The reaction products and catalyst suspended therein are withdrawn from the reaction vessel through line 13 into a solids separating zone 14, which may be constructed in the form of a "cyclone," centrifugal or other type of separator. The gaseous products are withdrawn by line 15 and may be passed through one or more secondary cyclone separators 16 and/or electrical precipitators or filters to remove additional catalyst. The resulting gases will consist mainly of hydrogen, oxides of carbon and any inert gases supplied to the reaction zone, such as nitrogen. The proportion of carbon monoxide to carbon dioxide will be dependent upon the proportions of the reagents supplied to the reaction zone and the temperature therein, high reaction temperatures of the order of 1600 to 2400° F. favoring the formation of large amounts of carbon monoxide while low reaction temperatures of the order of 800 to 1200° F. and large proportions of steam favor the formation of carbon dioxide, according to the well known water-gas equilibrium between carbon monoxide, carbon dioxide and steam. If it is desired to use the product gases for the preparation of liquid or solid hydrocarbons by reactions of the type of the Fischer-Tropsch synthesis, the reaction will preferably be conducted in the reaction vessel 9 at a high temperature and with limited amounts of steam, some carbon dioxide being added to the reaction zone, if desired, in order to obtain a satisfactory ratio of carbon monoxide to hydrogen: this gas may then be passed directly to a reaction zone for the synthesis of liquid and solid hydrocarbon products.

The treatment to which the solid material is subjected after separation from the product gases is dependent upon the nature of the materials supplied to the reaction vessel, the reaction occurring therein and the type of reaction products desired. For example, in the conversion of low molecular weight, substantially saturated hydrocarbon gases of less than about 4 carbon atoms per molecule and mixtures thereof which are substantially free of catalyst poisons, no catalyst regeneration problem is usually involved. In such cases, the solid catalyst material may be recycled directly to the reaction zone.

The production of hydrogen by the process of this invention from gases containing large amounts of unsaturated hydrocarbons or from vapors of normally liquid hydrocarbons such as gas oil vapors, usually is accompanied by the deposition of carbonaceous materials on the catalyst with resultant loss in activity. The catalyst, particularly the metals of the iron group, also lose activity if the reagents contain any appreciable amount of sulfur compounds. In both such cases, the catalyst may be readily reactivated by treatment with suitable regenerating gases. Where the reaction in vessel 9 is conducted at relatively high temperatures above about 1600° F., the catalyst may be regenerated by treatment with any suitable oxidizing gas such as steam, air, mixtures of steam and air, flue gas, and the like, and the resulting catalyst may be recycled directly to the reaction zone either without further treatment or after reduction of the oxides of the catalytic metals, as by treatment with hydrogen. When the reaction in vessel 9 is conducted at lower temperatures of the order of 800 or 1000° F. to about 1400° F., it is generally preferred for the catalyst introduced to contain a high proportion of free active catalytic metal, particularly active nickel, and in such cases, the recycled catalyst may be regenerated by treatment with hydrogen; if an oxidizing gas is used for the regeneration, the oxidized catalyst should be subjected to a reducing treatment, preferably with hydrogen. Such reducing treatment may be accomplished by supplying hydrogen or gases containing free hydrogen through line 3 to column 2 in sufficient amounts to reduce the catalyst therein to any desired degree. It is also preferable, particularly when highly active catalysts are desired for use at relatively low temperatures in the reaction vessel 9, to avoid heating the catalyst to any temperature sufficiently high to cause substantial reduction in its activity during the regeneration and/or reduction treatments just described. Temperatures sufficiently high to cause sintering of any of the catalyst components are generally undesirable in all circumstances, and maximum temperatures below about 1800° F. and preferably below about 1600° F. should be employed when it is desired to maintain the catalyst in a state of high activity suitable for relatively low temperature operations in vessel 9. With very rugged catalysts, temperatures as high as 2200 to 2400° F. may be used.

The catalysts need not be of high activity for operation at such high temperatures. Such operation is advantageous in the preparation of gas of low carbon dioxide content, which is desired in feed gas for the Fischer synthesis, for example.

The use of an oxidation treatment in the catalyst cycle will also be desirable when reducible metal oxides are used as a source of heat in promoting the hydrogen production reaction in vessel 9 in order to return the resultant reduced materials to their initial state of oxidation.

Where the catalyst is recycled directly without regeneration, or with such regeneration as can be secured by means of the gas supplied by line 3 to the column 2, the separators 14 and 16 may discharge the catalyst separated therefrom directly into the hopper 1. The drawing illustrates the modification of this invention where some additional regeneration is desired. In this case, the catalyst and any other solid materials separated from the gaseous products in separating zone 14 may be passed downwardly through a stripping column 17 in countercurrent to steam or other suitable stripping gas supplied by line 18 and into hopper 19. This hopper is provided with a column 20 and a gas supply line 21 for maintaining the catalyst therein in a mobile or fluidized condition. It is also provided with a safety valve 22 and a control valve 23, all of which operate similarly to the hopper 1, column 2, etc. Any desired portion of the catalyst may thus be recycled directly to the reaction vessel 9 by line 24 by means of a suitable carrying gas such as inert gas, steam or other reagent gas supplied by line 25.

The hopper 19 is also provided with a second column 26 for use in the catalyst regeneration cycle. This column 26 is constructed and operated similarly to the column 2, already described. A suitable regenerating gas such as steam or steam with added air or oxygen is supplied by line 26 to the mixing chamber 27 and is used to carry the catalyst through the regenerator 28 and thence to the hopper 1.

As discussed above, the regeneration of the catalyst and other solid materials may involve merely the removal of sulfur, which may be accomplished by using hydrogen or steam as the regenerating gas at about the same temperature used in the reactor 9, or the regeneration may involve the removal of carbonaceous materials and other impurities deposited on the catalyst, which may be done by subjecting the catalyst to treatment at elevated temperatures of about 1400° F. to 1800° F. with steam or oxidizing gases. Where relatively severe oxidation conditions are desired, as in the regeneration of reducible oxides which have been used to supply heat in the reaction vessel 9 and in other cases in which the reaction therein is conducted at high temperatures, the regenerator 9 may be operated at higher temperature of the order of 2000 to 2200° F. or even higher with suitable refractory catalysts by supplying a mixture of air in large excess and combustible materials such as methane, oil vapor, etc. to the regenerator 28 along with the catalyst, the combustion occurring therein serving to raise the temperature of the catalyst to any desired degree. The sensible heat of the highly heated catalyst is thus useful in providing heat required for the reaction in vessel 9.

The regenerator 28 may be operated in the same manner as the reactor 9, a suspension of the used catalyst and any other solid materials in a stream of a suitable regenerating gas such as hydrogen, steam, air or other gas, depending upon the conditions of regeneration desired, being supplied to the lower portion thereof through line 27 with any suitable means being also provided for heating or cooling the regeneration zone as required. The regenerated catalyst and gases leaving the regeneration zone 28 are passed by line 29 to separating zone 30, which may be constructed similarly to separating zone 14 discussed above, and the solid material separating therein is passed downwardly through a stripping zone 31 into the hopper 1. A suitable stripping gas, such as steam, is supplied by line 32. The gases leaving the separator 30 may pass through one or more secondary separators 33, from which the separated catalyst is returned by line 34 which discharges into the hopper 1 at a point below the level of the catalyst therein.

If it is desired to prepare a hydrogen gas substantially free of oxides of carbon, it will generally be preferable to subject the product gas from the reaction vessel 9 to a separate catalytic treatment at a somewhat lower temperature for the conversion of the carbon monoxide therein to carbon dioxide, and to remove the carbon dioxide from the product gases by any suitable treatment. Such processes are generally well known and need not be described here in detail, it being sufficient to state that the gases are passed with a large excess of steam, preferably about 3 to 4 volumes of steam per volume of carbon monoxide, through a reaction zone containing a suitable water-gas catalyst such as iron oxide at a temperature of about 700 to 950° F., wherein the carbon monoxide is converted substantially completely to carbon dioxide which is removed from the product gases, preferably after cooling substantially to atmospheric temperature. While this treatment may be conducted by passing the gases over a catalyst arranged on trays or packed in a reaction vessel, the process may also be conducted in a manner similar to that described above in which the solid catalyst is suspended in a stream of the gaseous reagents and this suspension is passed through the reaction zone, the catalyst being recycled.

For example, the gases in line 35 may be passed through a suitable cooler 36 and then may be forced, if necessary, by compressor 37 or other suitable pressure device into a mixing chamber 38 in which they are used to suspend a suitable water-gas catalyst such as iron oxide supplied thereto from hopper 40 and column 41, which may be operated in the same manner as the hopper 1 and column 2 and may be supplied with any suitable gas, such as steam, for maintaining the catalyst in a mobile or fluidized state therein by line 42. Additional steam as required for the reaction may be supplied at any suitable point, such as by line 43.

The suspension of catalyst in the reagent gases leaving the mixing chamber 38 may be passed by line 44 into a reaction vessel 45 which may be constructed and operated similarly to reaction vessel 9. The reaction in this vessel will be mildly exothermic, and it is generally desirable to provide suitable means for avoiding undue rise in the temperature therein. This may be accomplished by supplying the reagent mixture in line 44 at a temperature sufficiently below the maximum temperature desired in the reaction vessel 45 for the resultant mixture therein to achieve the desired temperature.

The stream of gaseous products and catalyst suspended therein leaving the reaction vessel 45 by line 46 is passed into a suitable separating zone 47, which may be constructed and operated similarly to separator 14 and from which the catalyst returns to the hopper 40.

The product gases leaving the separator 47 may be passed through one or more additional separators 48 to remove any remaining traces of solid materials, through a cooler 49 in which they are cooled, preferably to about atmospheric temperature and into a separator 50, wherein any condensed water is removed. The remaining gases then pass by line 51 into a scrubbing column 52 which is supplied with any suitable absorbent for carbon dioxide, such as the ethanol amines, aqueous sodium hydroxide or sodium carbonate. Hydrogen gas substantially free of carbon dioxide leaves this column by line 53.

The reagents, catalysts and operating conditions used in the above described apparatus will naturally be varied according to the nature of the products desired, these conditions generally being already known; examples of suitable catalysts, reagents, and reaction temperatures having been given above simply as illustrations of methods for carrying out the process. The initial hydrocarbon gases or vapors used are preferably substantially free of sulfur compounds or are treated for the removal of any sulfur compounds contained therein before being used for the preparation of hydrogen by the processes described herein.

The reactions described above for the conversion of hydrocarbons to gases containing free hydrogen and for the conversion of carbon monoxide to carbon dioxide and hydrogen, and the catalyst regeneration treatments may be conducted at any suitable pressures which may be the same throughout the system or may be different in the different steps. These pressures will generally range between about 1 and 200 atmospheres, pressures below about 50 atmospheres and preferably below about 30 atmospheres generally being used when the initial reaction is primarily between hydrocarbons and steam, in view of the great proportions of steam required for conducting this reaction sufficiently to completion for practical purposes at higher pressures. The amount of catalyst supplied to the reaction and regeneration zones should generally be between about 0.1 and 25 pounds per cubic foot (at reaction conditions) of the feed gases supplied to the same zones. The optimum time of reaction of the gases in passing through the reaction and regeneration zones generally ranges between about ½ second and 2 minutes, the time of residence of the catalyst in these zones being somewhat longer than that of the gas.

An important advantage of the process described herein is in the uniformity of temperature which is consistently maintained throughout the reaction vessels and regenerating zones when operating with a catalyst suspension maintained therein as described. Once the reaction is started, the temperature will be found to be uniform within a few degrees throughout all parts of the reaction vessel due to the extreme turbulence existing in the catalyst suspension therein, even though the catalyst and/or the gases, either fresh or recycled in either case, be supplied at a greatly different temperature. In all such cases, it is of course desirable to provide a sufficiently high average temperature level in the reaction zones to insure the progress of the reaction. Suitable steps are also necessary to supply the heat requirements of endothermic reactions and to take up the heat liberated in exothermic reactions in order to avoid a general cooling or overheating, respectively, of the reaction vessels. This may be accomplished by providing for the simultaneous carrying out of both endothermic and exothermic reactions in the reaction vessel in proper balance to maintain the desired temperature level or by supplying reagents, catalyst and/or recycled materials to the reaction zone at a sufficiently higher or lower temperature than the reaction temperature to supply or to take up, respectively, the heat requirements or the heat liberated therein. Heat exchanger surfaces may also be provided in the reaction and the regeneration zone, such as tubes or coils, through which combustion gases or water or other suitable heating or cooling fluids may be circulated.

The various catalyst supply columns described above are preferably designed to be of sufficient height to provide for continuous circulation of the catalyst through the system by the suspending gases as indicated, each column being of sufficient height to provide for the pressure drop involved in passing the catalyst suspension through any control valves at the bottom of that column and through the reaction and/or regeneration equipment to the next catalyst feed column in the circuit. Additional column height may be provided as desired to increase the pressure in the reaction and/or regeneration zones. The catalyst supply hopper at the top of each feed column may be at substantially atmospheric pressure or, particularly when the reactions involving the use of the catalyst are conducted at substantially superatmospheric pressures, the entire catalyst circuit may be operated as a closed system and the catalyst may thereby be separated from the product gases at a pressure little lower than that at which it was charged, thereby considerably reducing the differential pressure to be developed in the supply columns. A savings in the compression of the product gases is also usually obtained, as the volume of the product gases is usually larger than that of the feed gases.

The following example is presented to illustrate a suitable method for carrying out the process of this invention in the preparation of substantially pure hydrogen from methane and steam.

*Example*

A suitable catalyst such as bauxite or alumina having nickel deposited therein is prepared as fine powder of which the major portion ranges in particle size between 10 and 50 microns. This catalyst powder is supplied to a standpipe having a height of about 100 feet. A small amount of hydrogen is supplied at spaced points along the side of the standpipe in order to maintain the catalyst in a fluid-like condition. The amount of fluidizing gas supplied should be sufficient to maintain a gas film about each catalyst particle at the zone of maximum pressure; in general, a minimum amount of about 3 to 4 cubic feet (at the conditions prevailing in the column) per 100 pounds of catalyst is required. A control valve at the bottom of the column is adjusted to permit a stream of this catalyst to flow therethrough at a rate of about 800 pounds per hour and a pressure drop across the valve of about 5 pounds per sq. in., into a mixing chamber. A mixture of 500 cubic feet per hour of methane and 1,500 cubic feet per hour of steam heated preferably to about the temperature of the catalyst is supplied to the mixing chamber at a pressure of about 35 pounds per sq. in. gauge. The mixture of methane, steam and catalyst entrained therein is passed into the bottom of a vertically disposed reaction chamber having a diameter of 10 inches and a height of about 20 feet. This reaction tube projects through a furnace and is heated externally so as to maintain a temperature of about 1,500° F. in the reaction products leaving the top of the tube. These products, with catalyst suspended therein, are returned without cooling to a series of cyclone separators at the top of the catalyst feed column. The catalyst separated from the product gases in these separators is returned to the top of the catalyst feed column under a pressure of about 30 pounds per sq. in. gauge and is thus recycled continuously through the reaction zone. The product gases, consisting of hydrogen, unreacted methane and about equal amounts of carbon monoxide and carbon dioxide are then cooled by addition of about 1,500 cubic feet per hour of steam and are passed into a mixing chamber at the bottom of a second catalyst supply column which contains a suitable water gas catalyst such as a promoted iron oxide which is also in powder form. This catalyst supply column is also about 100 feet high and is operated in the same manner as the one described above and is adjusted to supply about 1600 pounds per hour of the water gas catalyst to the mixing chamber. The resulting suspension of catalyst is passed from this mixing chamber into the bottom of a vertically disposed converter having a diameter of 15 inches and a height of 20 feet. This converter is provided with an internal cooling coil which is used to generate steam and which is supplied with water at such a rate as to maintain a temperature of about 750° F. in the reaction products leaving the top of the converter. These reaction products, with the catalyst suspended therein, are passed to a second series of cyclone separators at the top of the water gas catalyst supply column and the catalyst is separated from the product gases and returned to this column for recycling. Hydrogen or steam is supplied in a proportion of about 15 cubic feet per 100 pounds of catalyst to this column at several spaced points along its side in order to maintain the catalyst in a fluid state. The product gases, after separation of the catalyst, are cooled in a water spray and the carbon dioxide is then removed by scrubbing with a suitable absorption medium such as water or aqueous sodium carbonate. There will thus be obtained a hydrogen gas under a pressure of about 20 pounds per sq. in. gauge containing about 1% to 2% methane, less than 2% carbon monoxide, any nitrogen present in the original methane and the remainder hydrogen, thus representing a conversion of approximately 95% to 90% of the original methane.

This invention is not to be limited to any specific examples presented herein, all such being intended solely for purposes of illustration, as it is intended to claim this invention as broadly as the prior art permits.

We claim:

A process for the preparation of hydrogen which comprises supplying a finely divided catalyst containing a metal of the iron group and alumina to a column of substantial height, maintaining the catalyst in a mobile state in said column, passing a stream of said catalyst from the bottom of said column under a pressure at least equal to the hydraulic head of said column into a reaction zone maintained at a suitable temperature for said reaction and passing a mixture of a hydrocarbon gas and steam upwardly through said reaction zone at a velocity to maintain the catalyst in a turbulent state therein and to produce a suspension of said catalyst in said gas and steam, withdrawing catalyst and product gas comprising free hydrogen in substantial proportion and oxides of carbon from said reaction zone, cooling the product gas by injecting a relatively large amount of steam thereinto, mixing the cooled product gas and steam with an iron oxide catalyst in powder form, passing the resulting mixture into a second reaction zone to convert at least a portion of the carbon monoxide in the product gas to carbon dioxide, removing product gas from the second reaction zone and recovering hydrogen from the last mentioned product gas.

EGER V. MURPHREE.
CHARLES W. TYSON.
DONALD L. CAMPBELL.
HOMER Z. MARTIN.

REFERENCES CITED

The following references are of record in the file of this patent:

UNITED STATES PATENTS

| Number | Name | Date |
|---|---|---|
| 2,135,694 | Bardwell et al. | Nov. 8, 1938 |
| 2,231,424 | Huppke | Feb. 11, 1941 |
| 1,799,858 | Miller | Apr. 7, 1931 |
| 2,231,231 | Subkow | Feb. 11, 1941 |
| 2,065,643 | Brandt | Dec. 29, 1936 |
| 1,577,534 | Miller | Mar. 23, 1926 |
| 2,273,075 | Weems | Feb. 17, 1942 |
| Re. 21,526 | Odell | Aug. 6, 1940 |
| 2,327,175 | Conn | Aug. 17, 1943 |

FOREIGN PATENTS

| Number | Country | Date |
|---|---|---|
| 553,037 | Germany | Sept. 8, 1931 |